(12) United States Patent
Lobo

(10) Patent No.: US 9,092,417 B2
(45) Date of Patent: Jul. 28, 2015

(54) SYSTEMS AND METHODS FOR EXTRACTING DATA FROM A DOCUMENT IN AN ELECTRONIC FORMAT

(71) Applicant: Web Access, Inc., Wilton, CT (US)

(72) Inventor: Stephen Lobo, Wilton, CT (US)

( * ) Notice: Subject to any disclaimer, the term of this patent is extended or adjusted under 35 U.S.C. 154(b) by 0 days.

(21) Appl. No.: 14/341,333

(22) Filed: Jul. 25, 2014

(65) Prior Publication Data

US 2015/0026200 A1    Jan. 22, 2015

Related U.S. Application Data

(62) Division of application No. 12/401,511, filed on Mar. 10, 2009, now Pat. No. 8,825,592.

(51) Int. Cl.
*G06F 7/00* (2006.01)
*G06F 17/27* (2006.01)
*G06F 17/30* (2006.01)

(52) U.S. Cl.
CPC ...... *G06F 17/2725* (2013.01); *G06F 17/30011* (2013.01); *G06F 17/30097* (2013.01); *G06F 17/30115* (2013.01); *G06F 17/30719* (2013.01)

(58) Field of Classification Search
CPC .................................................. G06F 17/30097
See application file for complete search history.

(56) References Cited

U.S. PATENT DOCUMENTS

2006/0253476 A1\* 11/2006 Roth et al. .................... 707/100
2007/0192687 A1\* 8/2007 Simard et al. ................. 715/523

\* cited by examiner

*Primary Examiner* — Ajith Jacob

(57) ABSTRACT

A computer-implemented method of extracting data from a document in an electronic format. The method includes the steps of accessing a file in an electronic format from a memory module; extracting data from the file corresponding to a plurality of keys contained within a mapping structure stored in the memory module; organizing the extracted data into values, wherein each value maps to one of the plurality of keys to form a hash map; storing the hash map in a database; and providing a user access to the database via an output device. The output device allows the user to view a customizable document whose content is derived from the values and keys stored in the database.

4 Claims, 16 Drawing Sheets

| Field Name | Table Name | Search Strings | | Is Primary Key Exist | Primary Key Value |
|---|---|---|---|---|---|
| nb_deal_id | nb_structured_tranche_master | | Alphanum | yes | nb_tranche_id |
| nb_tranche_id | nb_structured_tranche_master | class | Alphanum | yes | nb_tranche_id |
| nb_cusip | nb_structured_tranche_master | cusip | Alphanum | yes | nb_tranche_id |
| nb_class_description | nb_structured_tranche_master | | number | yes | nb_tranche_id |
| nb_original_coupon | nb_structured_tranche_master | original face amount | number | yes | nb_tranche_id |
| nb_original_balance | nb_structured_tranche_master | record date | Alphanum | yes | nb_tranche_id |
| nb_factor_date | nb_structured_tranche_master | beginning certificate balance | number | yes | nb_tranche_id |
| nb_beginning_balance | nb_structured_tranche_master | ending certificate balance | number | yes | nb_tranche_id |
| nb_current_balance | nb_structured_tranche_master | interest distribution | number | yes | nb_tranche_id |
| nb_interest_distribution | nb_structured_tranche_master | principal distribution | number | yes | nb_tranche_id |
| nb_principal_distribution | nb_structured_tranche_master | total distribution | number | yes | nb_tranche_id |
| nb_total_distribution | nb_structured_tranche_master | scheduled principal distribution | number | yes | nb_tranche_id |
| nb_scheduled_principal_distribution | nb_structured_tranche_master | unscheduled principal distribution | number | yes | nb_tranche_id |
| nb_unscheduled_principal_distribution | nb_structured_tranche_master | certificate pass through rate*certificate pass-through rate | number | yes | nb_tranche_id |
| nb_coupon | nb_structured_tranche_master | current realized loss | number | yes | nb_tranche_id |
| nb_current_realized_loss | nb_structured_tranche_master | cumulative realized losses | number | yes | nb_tranche_id |
| nb_cumulative_realized_loss | nb_structured_tranche_master | realized loss | number | yes | nb_tranche_id |
| nb_realized_loss | nb_structured_tranche_master | current accrued interest | number | yes | nb_tranche_id |
| nb_accrued_interest | nb_structured_tranche_master | current interest shortfall(1) | number | yes | nb_tranche_id |
| nb_current_interest_shortfall | nb_structured_tranche_master | non supported interest shortfall*non-supported interest shortfall | number | yes | nb_tranche_id |
| nb_non-supported_interest_shortfall | nb_structured_tranche_master | | number | yes | nb_tranche_id |
| nb_interest_realized_losses | nb_structured_tranche_master | ending certificate/ notional balance | number | yes | nb_tranche_id |
| nb_pool_factor | nb_structured_tranche_master | | number | yes | nb_tranche_id |
| nb_factor_multiplier | nb_structured_tranche_master | accretion | number | yes | nb_tranche_id |
| nb_accretion | nb_structured_tranche_master | total principal reduction | number | yes | nb_tranche_id |
| nb_total_principal_reduction | nb_structured_tranche_master | total principal distribution | number | yes | nb_tranche_id |
| nb_total_principal_distribution | nb_structured_tranche_master | | number | yes | nb_tranche_id |
| nb_upi_payment | nb_structured_tranche_master | total interest distribution | number | yes | nb_tranche_id |
| nb_total_interest_distribution | nb_structured_tranche_master | | number | yes | nb_tranche_id |
| nb_upi_balance | nb_structured_tranche_master | | Alphanum | yes | nb_tranche_id |
| nb_last_update_date | nb_structured_tranche_master | | number | yes | nb_tranche_id |
| nb_deferred_interest | nb_structured_tranche_master | payment of unpaid interest shortfall(1) | number | yes | nb_tranche_id |
| nb_unpaid_interest_shortfall | nb_structured_tranche_master | | number | yes | nb_tranche_id |

Fig. 6

Edit Deal Mappings

Deal Name : American Home Mortgage — 143

146 — Table Name: [Select Table ▼]
148 — Primary Key Value: [Select ▼]
150 — Field Name: [Select Field ▼]
Search String: [                    ] — 144
152 — Data Type: [Select ▼]

[ Save ]

Fig. 15

VIEW DEALS

Please Select a deal to Delete.

| American Home Mortgage |
|---|
| BAM |
| BAM_2004C_RMT |
| Cendant |
| CW05-07 |
| CW05 07_COMP0702 |
| CWA05BC5 |
| CWT05-59_COMP0702 |

[ Delete ]

Fig. 16

| Internet Explorer | |
|---|---|
| DEAL ID: Bank of America Mortgage Securities, Inc. Mortgage Pass - Throuh Certificates Series 2004 - C | |
| ⊟ Deal Information | |
| Attribute Name | Attribute Value |
| deal_id | Bank of America Mortgage Securities, Inc. Mortgage Pass - Through Certificates Series 2004 - C |

⊞ Tranche Information
⊞ Fund Information
⊞ Level Of Subordinate Information

Fig. 19

SYSTEMS AND METHODS FOR EXTRACTING DATA FROM A DOCUMENT IN AN ELECTRONIC FORMAT

CROSS-REFERENCE TO RELATED APPLICATION

This application is related to and is a divisional application of U.S. patent application Ser. No. 12/401,511, filed Mar. 10, 2009, and entitled "Systems and Methods for Extracting Data from a Document in an Electronic format," Applicant claims benefit of prior U.S. Nonprovisional patent application Ser. No. 12/401,511, pursuant to 35 U.S.C §121.

BACKGROUND OF THE INVENTION

1. Field of the Invention

The present invention relates to a computer-implemented system and method for culling relevant information from an electronic file. More particularly, the present invention is directed to a system and method for extracting relevant data from an electronic file and populating a database with the relevant data to allow a user or another program to further analyze and manipulate the data.

2. Description of Related Art

Tools for converting between document formats are well known in the art. For example, a conventional document format converter might take a portable document format (PDF) file and convert the file into a document that can be opened, read, and edited by a word processing program. The aim of these conventional converters is to allow a user access and possibly edit the content of the document in its current form, without adding any value to the content of the document. Conventional converters are designed to convert text, images, and other elements of a document from one format to another format while maintaining the look and feel of the original document as much as possible. The conventional converters are designed to simply recreate the text from the converted document; they do not categorize or index the text to make it more useful.

There is a need for a system that culls relevant data from documents stored in various electronic formats and converts the data into a form that can be indexed, manipulated, and stored in a database, allowing the data to be used by analytical programs that interpret the data and that are able to create reports based on the interpreted data. Accordingly, the present invention is directed to systems and methods of extracting data from an electronic document that meet these needs.

SUMMARY OF THE INVENTION

Advantages of the present invention will be set forth in and become apparent from the description that follows. Additional advantages of the invention will be realized and attained by the methods and systems particularly pointed out in the written description and claims, as well as from the appended drawings.

To achieve these and other advantages and in accordance with the purpose of the invention, as embodied herein, the invention includes a computer-implemented method of extracting data from a document in an electronic format. The method includes the steps of accessing a file in an electronic format from a memory module; extracting data from the file corresponding to a plurality of keys contained within a mapping structure stored in the memory module; organizing the extracted data into values, wherein each value maps to one the plurality of keys to form a hash map; storing the hash map in a database; and providing a user access to the database via an output device. The output device allows the user to view a customizable document whose content is derived from the values and keys stored in the database.

The step of extracting data from the file may also include reading parameters from the file to determine the coordinate system associated with the file; reading a plurality of line elements based on a starting point and an ending point in the coordinate system for each line element; forming a set of rectangles by determining which of the plurality of line elements overlap within the coordinate system; and analyzing the set of rectangles to detect a data table contained within one or more or the rectangles by analyzing a child rectangle and iteratively analyzing all parent rectangles with respect to the child rectangle until a data table is detected, the parent rectangle being defined as a rectangle that contains at least a portion of the child rectangle; scanning the data table for literals to form rows and separating the rows into columns; and comparing a header of each column of the data table to the keys within the mapping structure, and when a header matches a key, extracting the data in the column and the header and storing each literal in the column as a value in the hash map linked to the key.

A system for extracting data from a document in an electronic format is also provided. The system includes a memory module, a file in an electronic format stored in the memory module, a mapping structure stored in the memory module, a parser configured to read the file and the mapping structure and to extract data from the file corresponding to a plurality of keys found in the mapping structure, a database interfacing with the parser, the database being configured to receive the extracted data from the parser and store the data as a plurality of keys and values, and a user interface configured to allow access to the database.

The system may also include a validation engine adapted and configured to analyze the extracted data and classify the document as either completely parsed or partially parsed. The parser is configured to extract data from the file corresponding to a plurality of keys found in the mapping structure and to apply an alternate algorithm when the validation engine determines that the document has only been partially parsed.

The foregoing general description and the following detailed description are exemplary and are intended to provide further explanation of the invention claimed. The accompanying drawings, which constitute part of this specification, are included to illustrate and provide a further understanding of the methods and systems of the invention. Together with the description, the drawings serve to explain principles of the invention.

BRIEF DESCRIPTION OF THE DRAWINGS

FIG. 4 illustrates an exemplary XML output file generated by the system.

FIG. 5 illustrates an exemplary output file in a spreadsheet format, as generated by the system.

FIG. 6 illustrates an exemplary mapping file used in the parsing process implemented by the system.

FIG. 15 illustrates an exemplary edit deal mappings window forming part of the user interface of the system.

FIG. 16 illustrates an exemplary delete deals window forming part of the user interface of the system.

FIG. 19 illustrates an exemplary report in HTML format generated by the system.

DETAILED DESCRIPTION OF PREFERRED EMBODIMENTS

Reference will now be made in detail to the present preferred embodiments of the data extraction systems and methods, examples of which are illustrated in the accompanying drawings.

The invention provides systems and methods for culling relevant data from documents stored in various electronic formats and for converting the data into a form that can be indexed, manipulated, and stored in a database. The systems and methods enable the conversion of data from a form that can only be interpreted by a human into a form that can be interpreted and manipulated by a computer. The data can then be interpreted by analytical computer programs to create reports based on the extracted data. In this disclosure, a document in an electronic format is defined as a document that does not store in about the content of the document and the relationships between the content in the document. A digital document is defined as a document having content that is data mineable, that is, information about the content of the document and information about the relationships between different parts of the content of the document can be extracted from the document for further analysis and manipulation. The systems and methods of the present invention provide for an electronic to digital document converter.

Figure 1:
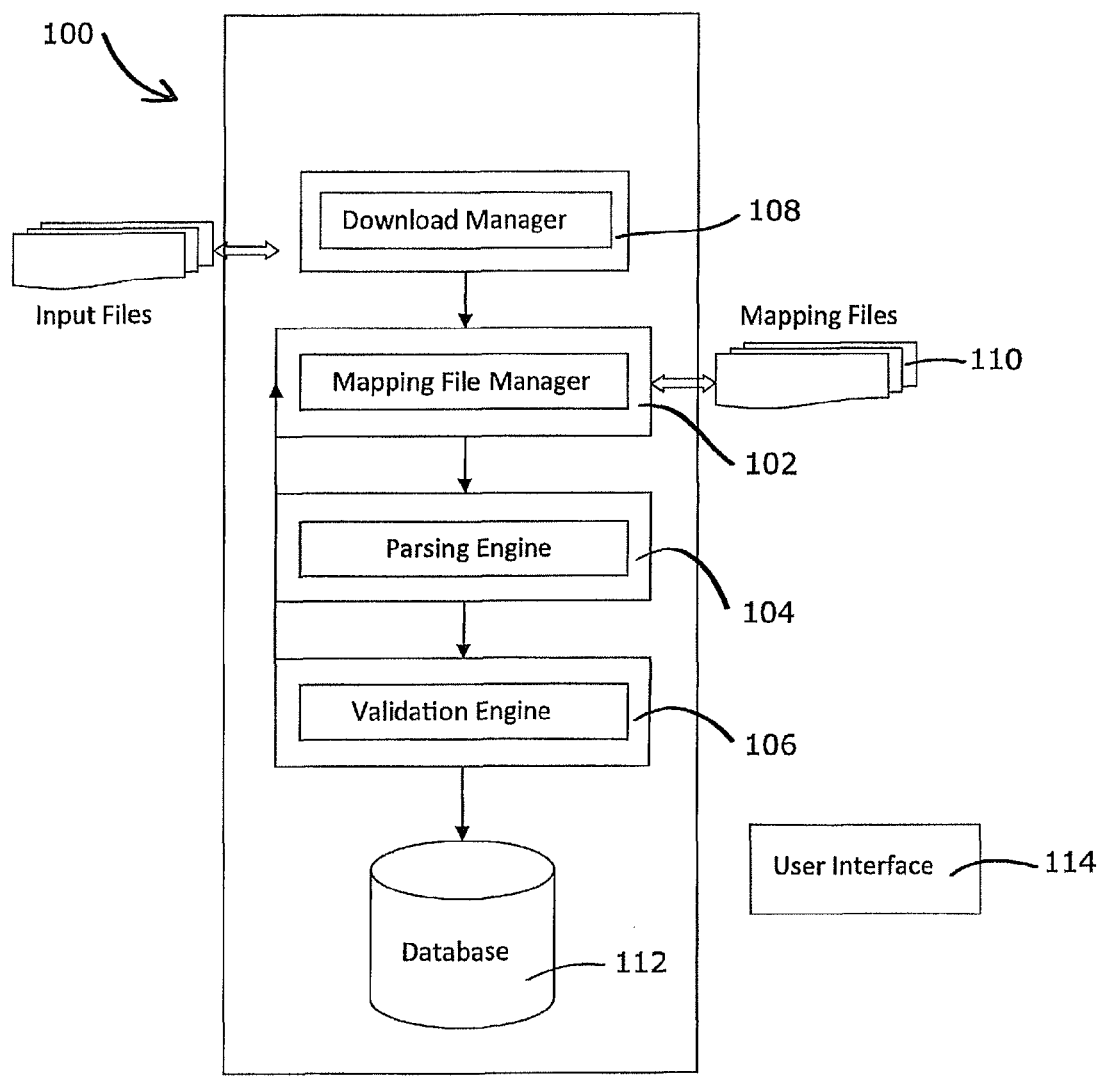
FIG. 1 is a schematic view of the architecture of a system for extracting data from a document in electronic format.

For purpose of explanation and illustration, and not limitation, an exemplary embodiment of the system in accordance with the present invention is shown in FIG. 1 and is designated generally by reference numeral 100. System 100 utilizes a three layer architecture that includes a mapping file manager 102, a parsing engine or parser 104, and a validation engine 106. System 100 may also include a download manager 108 that downloads electronic files from various sources and passes the files to mapping file manager 102. Download manager 108 may download the files from various sources and group the files together based on a pre-determined criteria. The criteria for grouping the files can be customized by a user. Mapping file manager 102 then creates a mapping file 110 that corresponds to a particular group of files. Alternatively, mapping file manager may load a previously created mapping file 110 that corresponds to the selected group of files. The group of files along with its corresponding mapping file 110 is then submitted to parser 104. Parser 104 parses the data within the group of files, which is then sent to the validation engine 106. Once the data has been validated, the data is stored in a database 112, where it can then be accessed and further analyzed and manipulated by a user or by a computer program. In one exemplary embodiment, a user interface 114 allows a user to interact with system 100 and to access the data stored in database 112.

Figure 2:
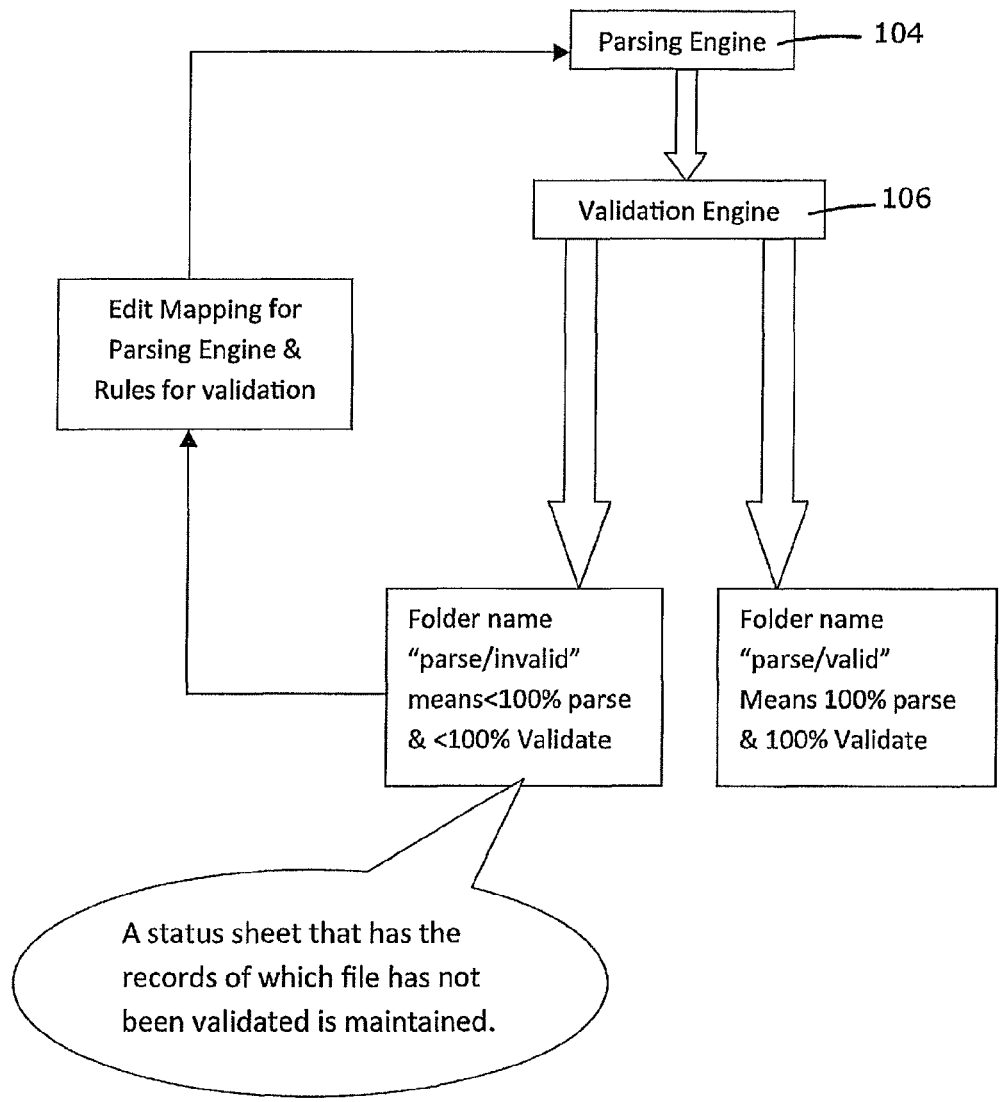
FIG. 2 is a schematic view of the validation process implemented by the system.

FIG. 2 illustrates the validation process utilized by system 100. During validation, parser 104 takes the group of files and the mapping file 110 received from the mapping file manager 102 and parses the data by searching for and extracting certain key terms defined in mapping file 110. The resulting data is then passed to validation engine 106 where the previously parsed data is compared to a set of rules defined in a validation structure within the validation engine. The rules may include rules for determining whether the data is mandatory, whether the data is unique, whether the data is numeric, or whether the data is the result of a calculation. Based on the number of rules satisfied by the data, the data is given a status as either completely parsed, partially parsed, or not parsed. If the validation of the data satisfies all of the rules outlined in the validation structure, then the data is given the status of completely parsed and the data is stored in database 112. If the data satisfies some, but not all, of the rules outlined in the validation structure, the data is categorized as being partially parsed. Mapping file manger 102 is then used to edit the mapping file to provide an alternative mapping structure or to apply an alternate algorithm in the parser. In one exemplary embodiment, mapping file 110 may be generated and/or edited manually by a user. Alternatively, mapping file 110 may be edited automatically using mapping file manager 102. The validation process is then repeated until all of the data has been completely parsed.

System 100 is capable of parsing documents in a wide variety of file formats, including platform neutral file formats such as the portable document format (PDF). System 100 is able co parse and extract data from such documents even if the documents are image based.

Figure 3:
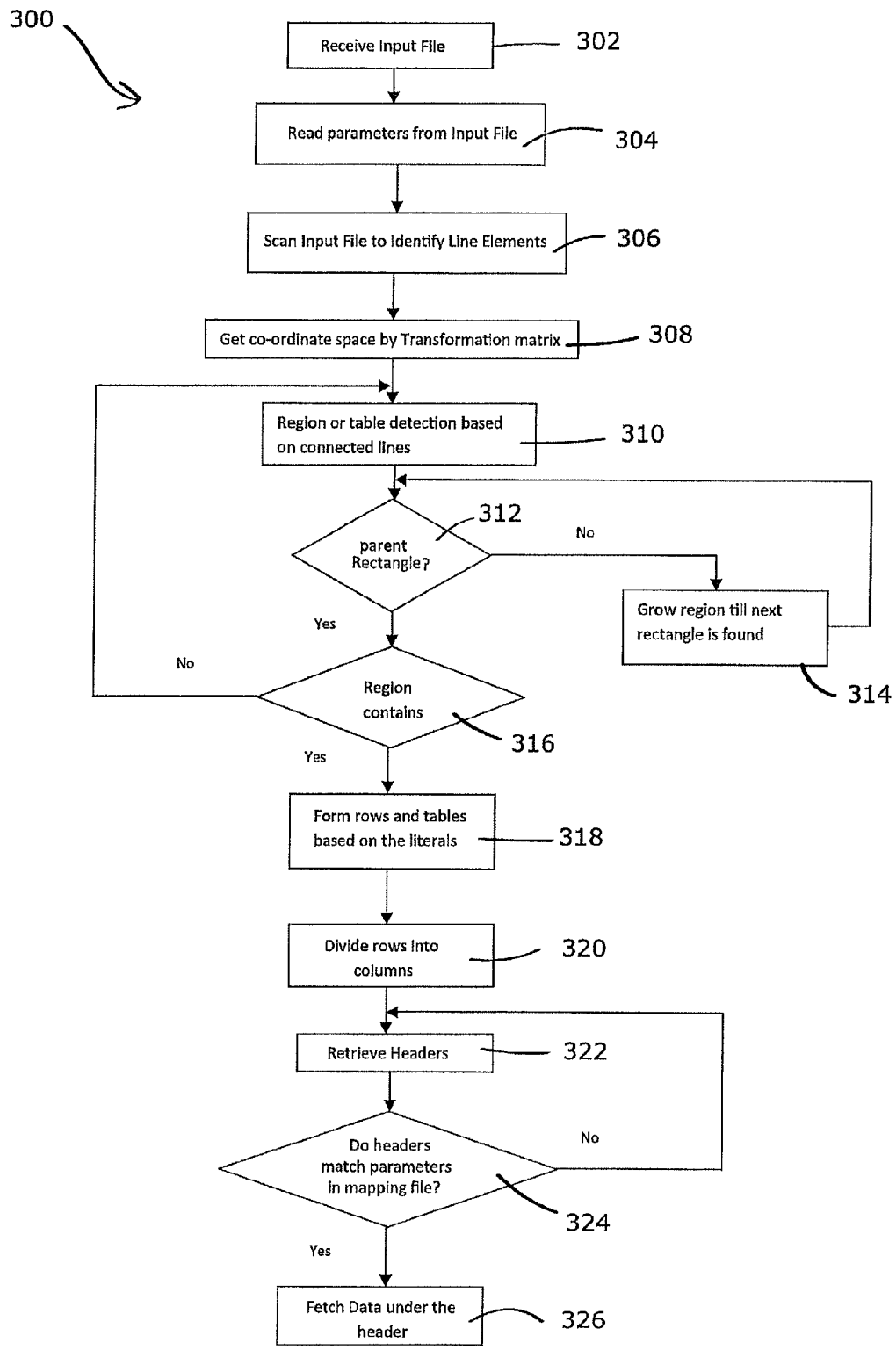
FIG. 3 illustrates a parsing process implemented by the system.

FIG. 3 illustrates the process 300 used by system 100 to parse and extract the relevant data from an image-based file format such as a PDF format. Process 300 is initiated when a document or several documents in the given file format are passed to parser 104 at step 302. At step 304, parser 104 reads parameters from the document such as height, width, x-coordinates, y-coordinates, and scale. Based on these input parameters, the coordinate system associated with the document are established. As indicated in step 306, parser 104 then scans the document and identifies a series of line elements within the document based on the starting point and ending point of each of the line elements within the established coordinate system in the document. In one exemplary embodiment, system 100 scans the document for text strings found in mapping file 110. If one of the text strings is located, a line element is formed based on the text string. Because each document may have its own coordinate system, it may be necessary to use a transformation matrix to convert the specific coordinate space to user space, which is a device independent and resolution independent coordinate space. This step of transforming the specific coordinate space into user space is shown as step 308 in FIG. 3.

Once the line elements have been formed, process 300 proceeds to step 310, where parser 104 searches for sets of connected line elements to determine whether a data table exists within the document. Parser 104 will determine that a pair of line elements are connected if and only if a y-coordinate point of a child line element lines between the x-coordinate points of a parent line element. Multiple connected lines are combined to form a rectangle. A particular rectangle is designated a child rectangle if a coordinate point found forming part of the rectangle falls inside a larger, or parent rectangle. As shown in steps 312 and 314, based on the child-parent relationship, once parser 104 determines that a parent rectangle exists, the parent rectangle is expanded or grown until the child rectangle fits completely within the parent rectangle. The parent rectangle is then considered for further processing. If parser 104 determines that the parent rectangle also a child rectangle, that is, if one of its coordinates falls within another larger rectangle, the larger rectangle becomes the parent rectangle. This process is continued until a region is formed, as indicated in step 316. In one exemplary embodiment, parser 104 may determine that a region has been formed when a parent rectangle covers a block of text within the document and when the parent rectangle is surrounded by white space. Each page of the document may contain more than one region.

In step 318, parser 104 scans each of the regions within the document for a series of literals and distributes the literals into rows. A literal is defined as a data type having a fixed value. For example, a literal could comprises a string of numbers or a string of text. The generated rows are then processed and sorted based on their x-coordinate values in an increasing order. For the purpose of table formation, the rows that have the maximum length are selected. As shown in step 320, parser 104 then divides the rows into columns. This is accomplished by determining the x-coordinate of the starting point and the x-coordinate of the ending point of the row having maximum length. Parser 104 then searches for additional literals having x-coordinates that fall into the range between the starting point and the ending point of the row having maximum length and organizes these literals into columns.

At step 322, parser 104 retrieves a header for each of the columns formed in the previous step. At step 324, Parser 104 then compares each of the column headers to parameters contained within mapping file 110 to determine whether the column header matches a parameter within the mapping file. The parameters contained within the mapping file may include search strings and data types. If parser 104 determines that a column header matches one of the parameters in the mapping file, parser 104 proceeds to retrieve all of the literals that make up the column underneath the header, as shown in step 326.

Figures 4, 5:
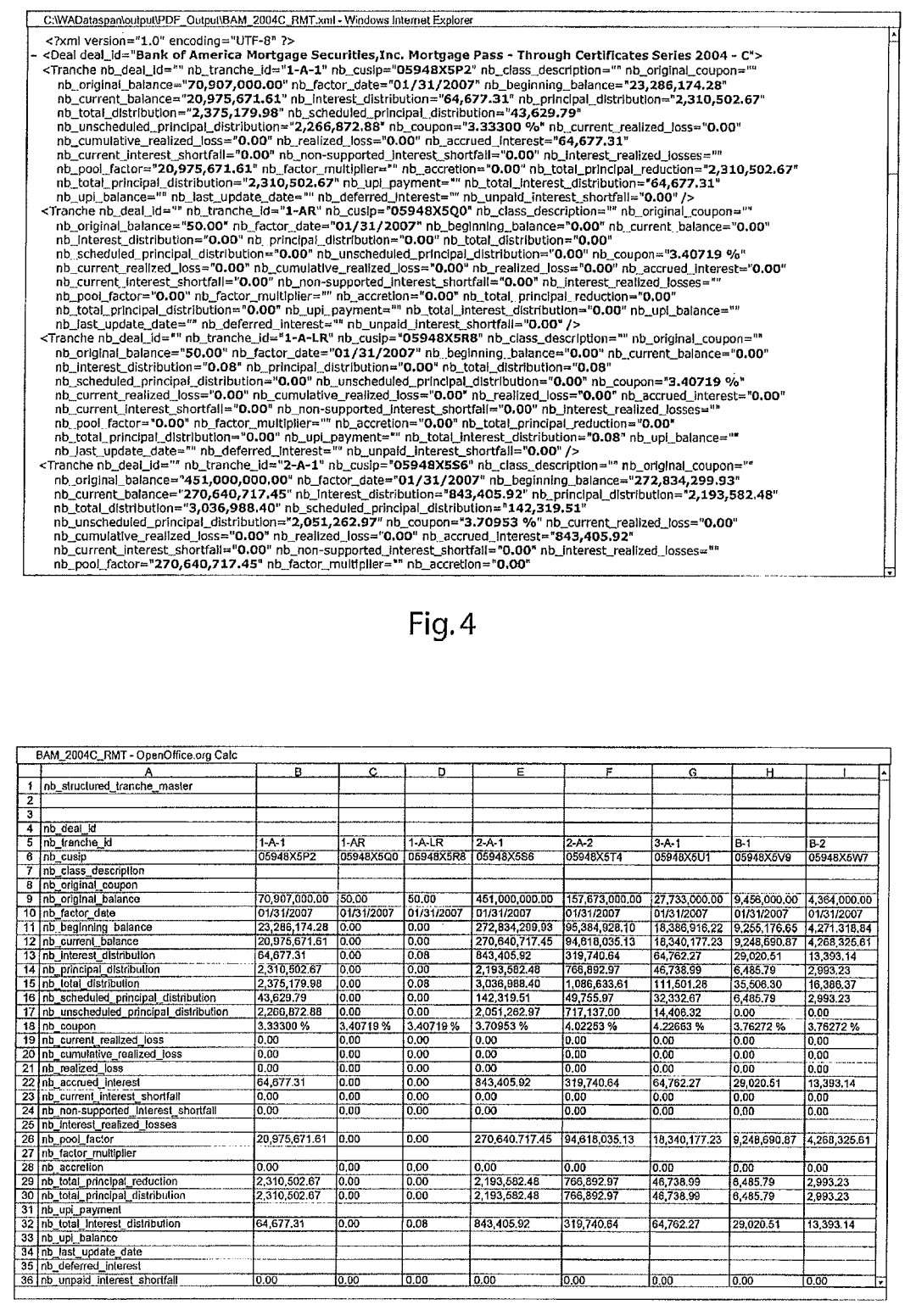

The columns and the rows generated by process 300 are then stored in database 112 where they can be accessed by user interface 114. System 100 may access the data stored in database 112 and may use the data to output a file that can then be used by another computer program or by a human user. The output file may be in any suitable file format, including extensible markup language (XML) format, as shown in FIG. 4, or a spreadsheet document, as shown in FIG. 5. The output file may also be in a comma separated values (CSV) format.

In one exemplary embodiment, system 100 may be used to create periodic deal data for analytical purposes. Using download manager 108, system 100 may download hundreds of deal documents from various sources, including dealers, brokers, banks, and other stakeholders. The deal documents may contain information regarding a class of assets and the current value of those assets. However, because the documents come from various sources, they may not be uniform in content or organization. System 100 is able to use mapping files 110 to locate the required data from within the various distinct deal documents.

Advantageously, system 100 is able to extract only relevant information, as defined by the contents of mapping file 110. The mapping structure found within mapping files 110 is the key to locating the relevant data from within the documents. FIG. 6 is an example of a mapping file that may be used by system 100 to extract relevant data from deal documents.

Figure 7:
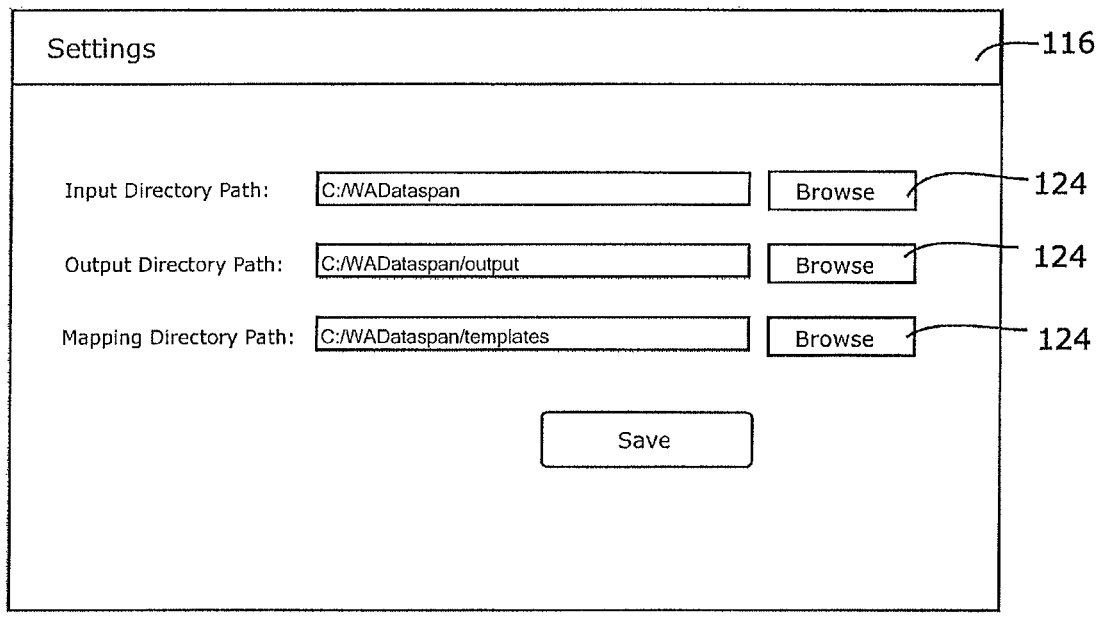
FIG. 7 illustrates an exemplary settings window forming part of the user interface of the system.
Figure 8:
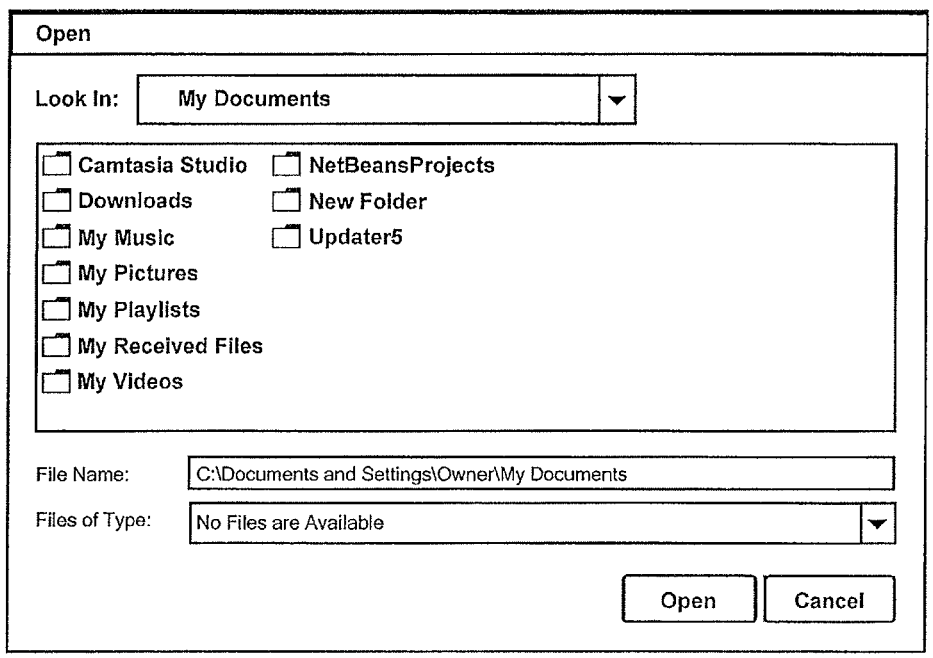
FIG. 8 illustrates an exemplary browse window forming part of the user interface of the system.

As shown in FIG. 7 in the exemplary embodiment, user interface 114 may include a settings window 116 allowing a user to select an input directory path 118, an output directory path 120, and a mapping directory path 122. Using the browse buttons 124 located within settings window 116, a user may access a browse window 126 to select a file path for the input file, the mapping file, and the output file, respectively.

Figures 9, 10:
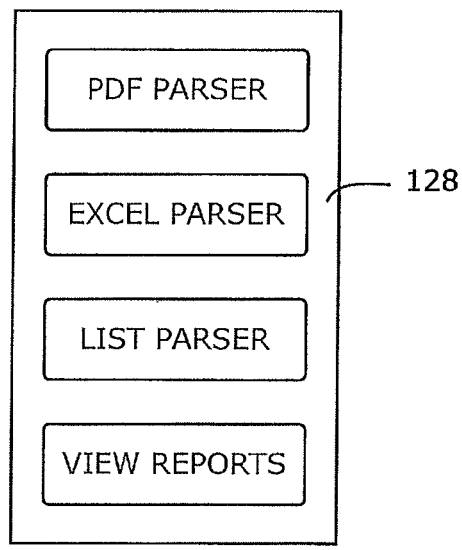
FIG. 9 illustrates an exemplary selection panel forming part of the use interface of the system.
FIG. 10 illustrates an exemplary dialog box forming part of the user interface of the system.

System 100 is able to parse input files in a variety of formats. For example, the input file may be in a application-independent format such as portable document format (PDF), in a spreadsheet file format such as a Microsoft® Excel document, or a list file containing a list of various types of information. Each file format parsed using system 100 may require a different parser 104. As shown in FIG. 9, user interface 114 may include a selection panel 128 with options for selecting a parser based on the file format in which the input files are stored, including options for selecting a PDF Parser, a Spreadsheet File Parser and a List Parser.

As shown in FIG. 10, once a parser for a specific file type has been selected, a dialog box 130 is displayed, allowing a user to select either single file parsing or bulk file parsing. The user will be able to specify the path to a single file in the selected format or to specify the path to multiple files in the selected format.

Figure 11:
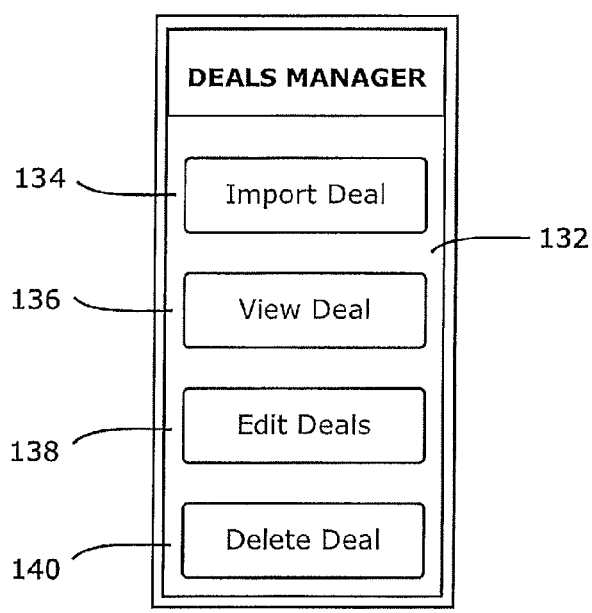
FIG. 11 illustrates an exemplary deals manager panel forming part of the user interface of the system.
Figure 12:
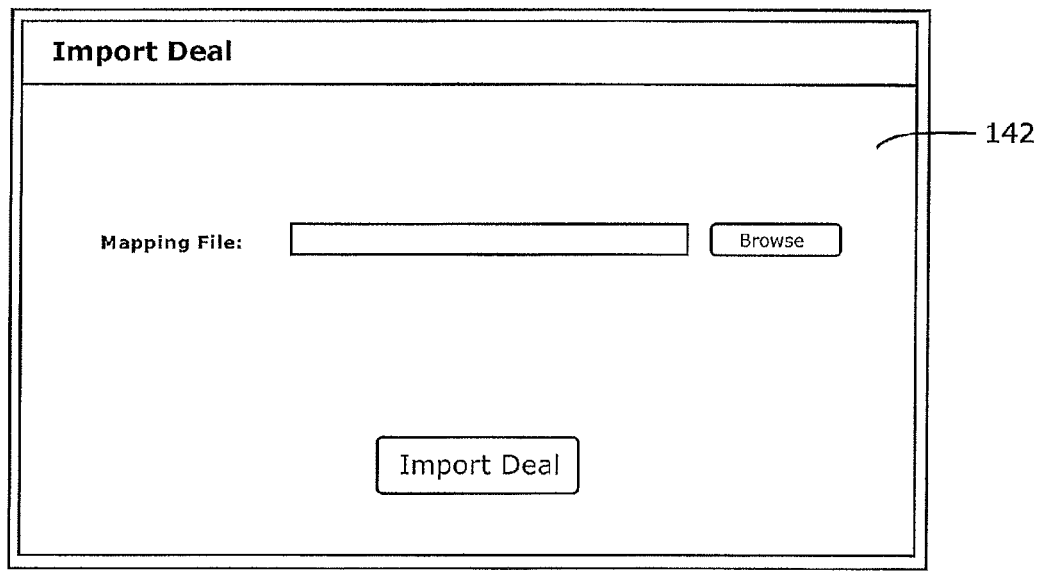
FIG. 12 illustrates an exemplary import deal window forming part of the user interface of the system.
Figure 13:
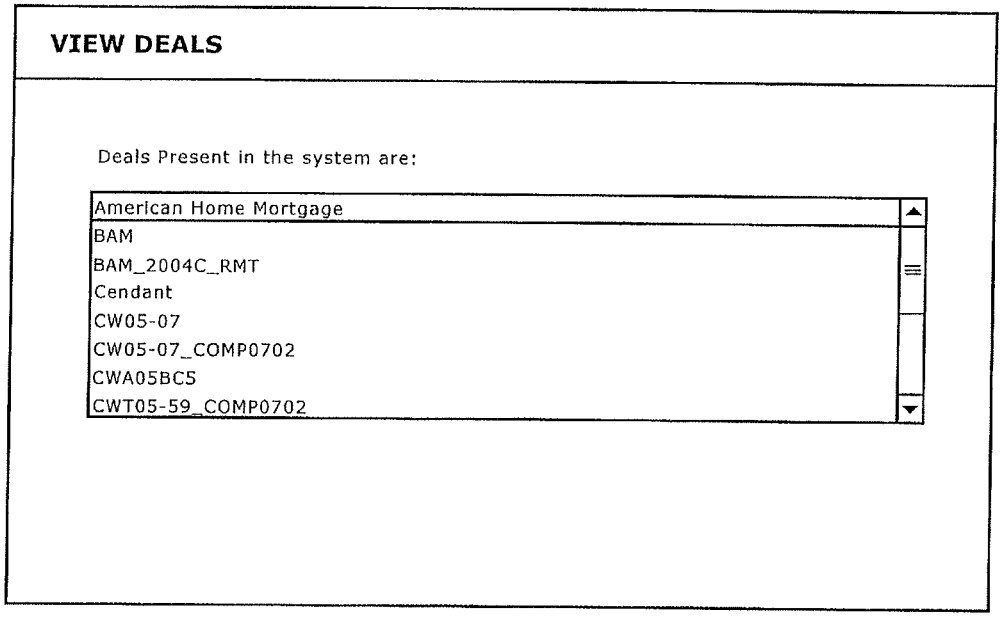
FIG. 13 illustrates an exemplary view deal window forming part of the user interface of the system.

In the exemplary embodiment, user interface 114 also includes deals manager panel 132, as shown in FIG. 11. Deals manager panel 132 allows a user to import, view, edit, and delete deal information used to parse deal documents. Selecting the import deal button 134 causes user interface 114 to display the import deal window 142, shown in FIG. 12. The import deal window allows a user to select a mapping file to be used for the deal documents that will be parsed. Selecting the view deal button 136 displays view deals window shown in FIG. 13. Selecting the delete deal button 140 displays the delete deals window, shown in FIG. 16, which allows a user to remove a deal from the system.

Figure 14:
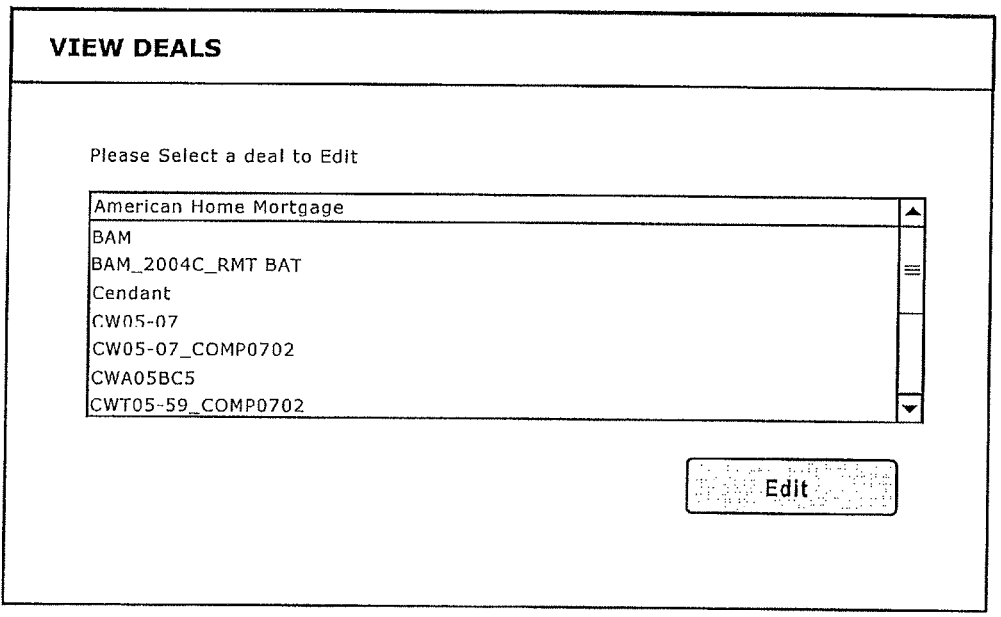
FIG. 14 illustrates an exemplary edit deal window forming part of the user interface of the system.

When the edit deal button 138 is selected, an edit deal window, as shown in FIG. 14, is displayed. Once a deal has been selected from within the edit deal window, an edit deal mappings window 143 is displayed, as shown in FIG. 15.

Mapping file 110 contains various keys which can be changed and saved using edit deal mappings window 143. Edit deal mappings window 143 may allow a user to enter a search string into text field 144 and to designate the table name 146, the primary key value 148, the field name 150, and the data type 152. Each of these parameters are then entered into mapping file 110, as shown in FIG. 6. System 100 will then use the changed value to locate the key values from within the deal documents. A key value may have aliases in the file format. In such a case, the multiple options can be specified as a key separated with a special character that is entered into search string text field 144. During parsing operations, system 100 searches for all possible keys mentioned in mapping structure 110 and locates the data based on the key value.

User interface 114 also includes a report generator that can be accessed using selection panel 128, illustrated in FIG. 9. The report generator allows the user to generate reports based on various input, parameters entered by the user. The user selects the setting for the report generator to determine the input files and the out files. Based on these selections, the input file is parsed and the information in the input file is converted from electronic form to an intermediate form and stored in database 112.

Figure 17:
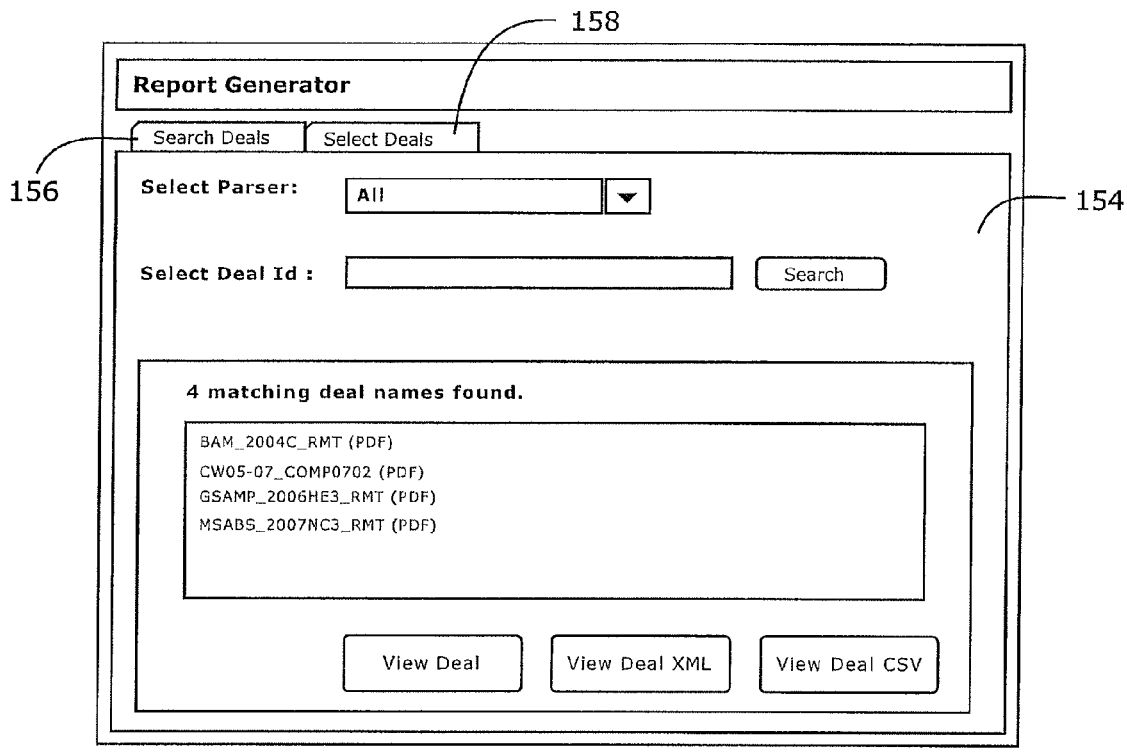
FIG. 17 illustrates an exemplary search panel tab within report generator window forming part of the user interface of the system.
Figure 18:
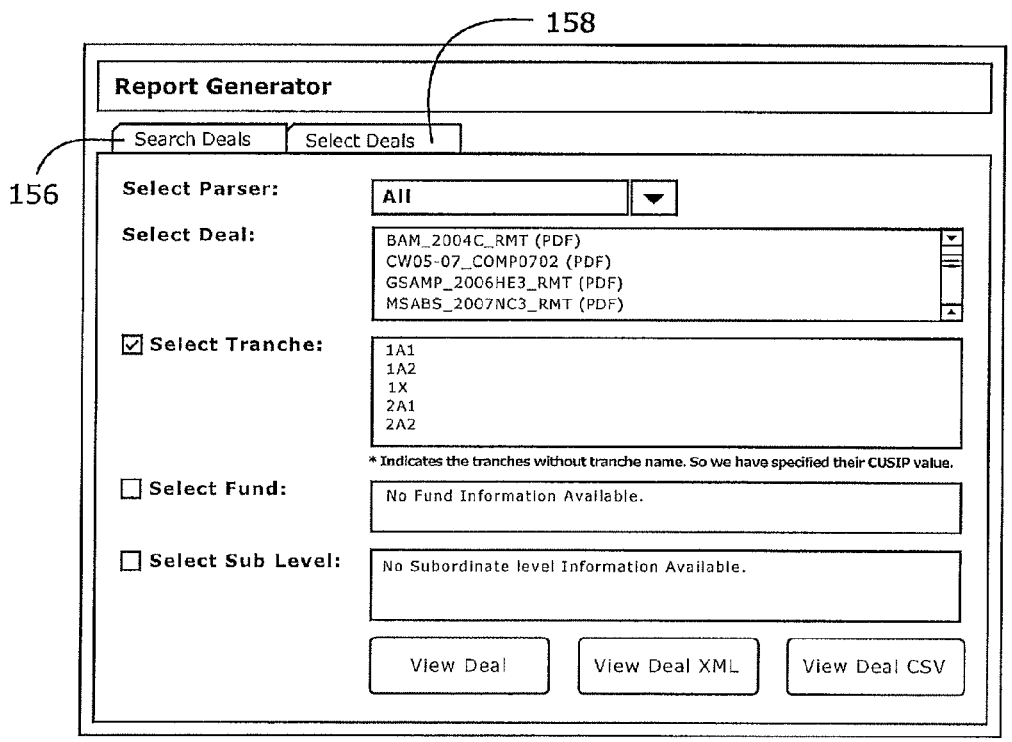
FIG. 18 illustrates an exemplary select deal tab within a report generator window forming part of the user interface of the system.

Selecting the view reports button on selection panel 128 causes user interface 114 to display a report generator window 154 that includes a search panel tab 156 and a select deal tab 158, as shown in FIGS. 17 and 18. Using the deal search panel tab 156, deals are viewable based on the selected search criteria. Search panel tab 156 provides options for viewing the report of deal information as either a hypertext markup language (HTML) document, as shown in FIG. 19, an XML document, as shown in FIG. 4, or a spreadsheet document, as shown in FIG. 5.

System 100 may comprise software components running on a computer system. The computer system may use any suitable operating system and may include a variety of hardware configurations. The computer system may include a processor coupled to a memory module and to a mass storage device via a bus or other communication medium; a display or other output device interfacing with the processor; and a keyboard, mouse, touchpad, or other input device that receives input from a user and interfaces with the processor.

The software implementing system 100 may include instructions written in a high level computer language and stored in the mass storage device. In one exemplary embodiment, system 100 is implemented in an object oriented language such as Java™, available from Sun Microsystems™.

Figure 20:
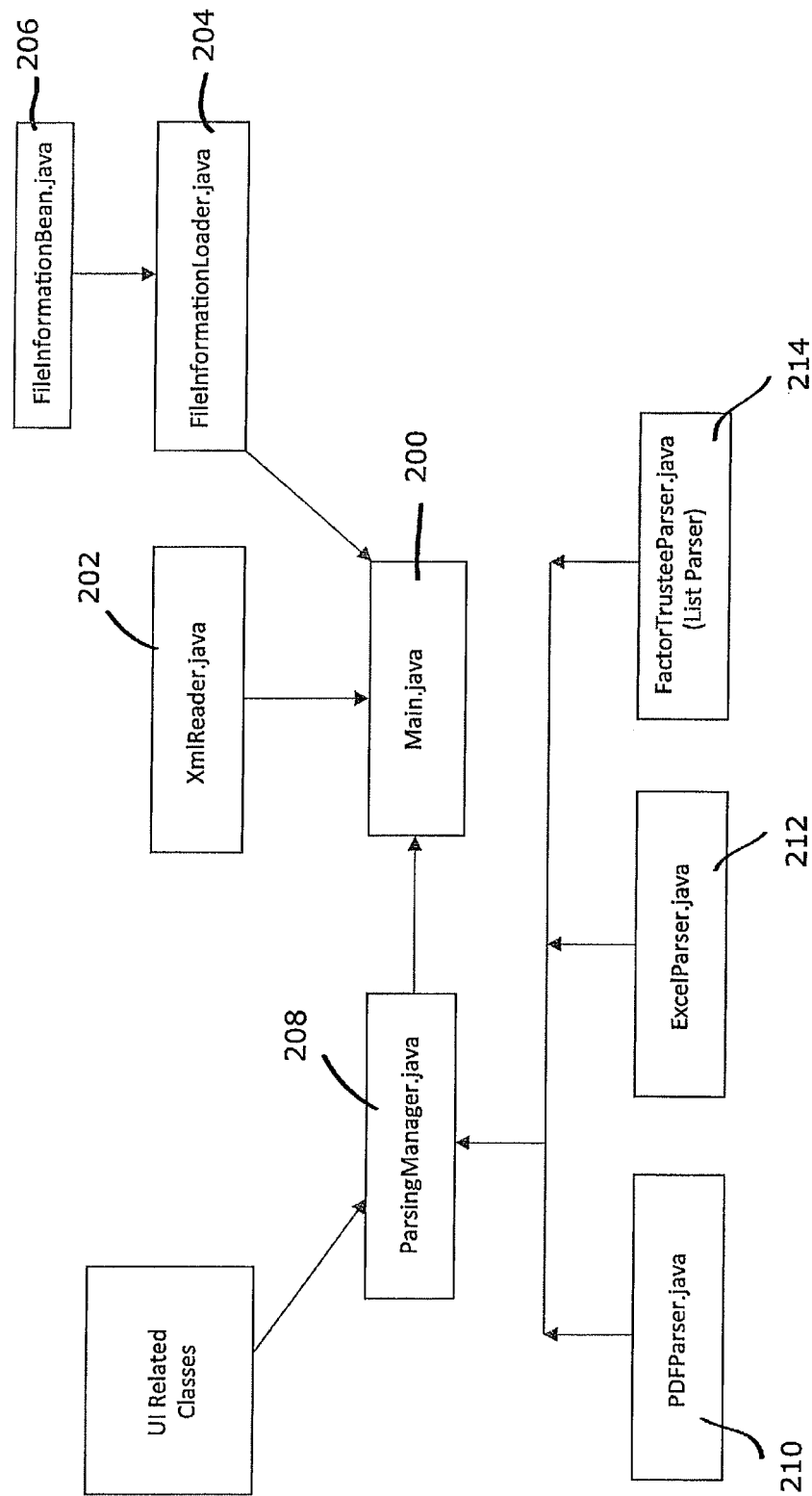
FIG. 20 illustrates the main class diagram of an implementation of an exemplary embodiment of the system of the present invention.

The class diagrams for implementation in Java™ of an exemplary embodiment of the system of the invention are illustrated in FIGS. 20 through 23. The main class 200 as depicted in FIG. 20 reads settings details from the XML reader class 202 and the file information from the class file information loader 204, respectively.

XML reader 202 uses a protected static class from the to read an XML value related to the input path, mapping path and the output path. XML reader 202 takes the file path and accesses as the root element in the XML file. XML reader 202 also gets every element into a hash map, which stores the data in the form of a key and value.

File information loader 204 reads the file path and creates a workbook and an object of row and cell and scans every value across the workbook, sheet by sheet and populates the file information bean 206, which stores the data in a bean having different attributes. A bean is defined as a reusable software component that can be manipulated within a builder tool. Beans are used to encapsulate many objects into a single object. Depending on the row and cell number, the value gets assigned to the respective attributes. This data is passed onto a parsing manager 208. Parsing manager 208 allows the selection of the type of parser and forwards the information to the selected parser, which is either a PDF parser 210, an EXCEL Parser 212 or a Factor Trustee or List Parser 214 (for list files).

Figure 21:
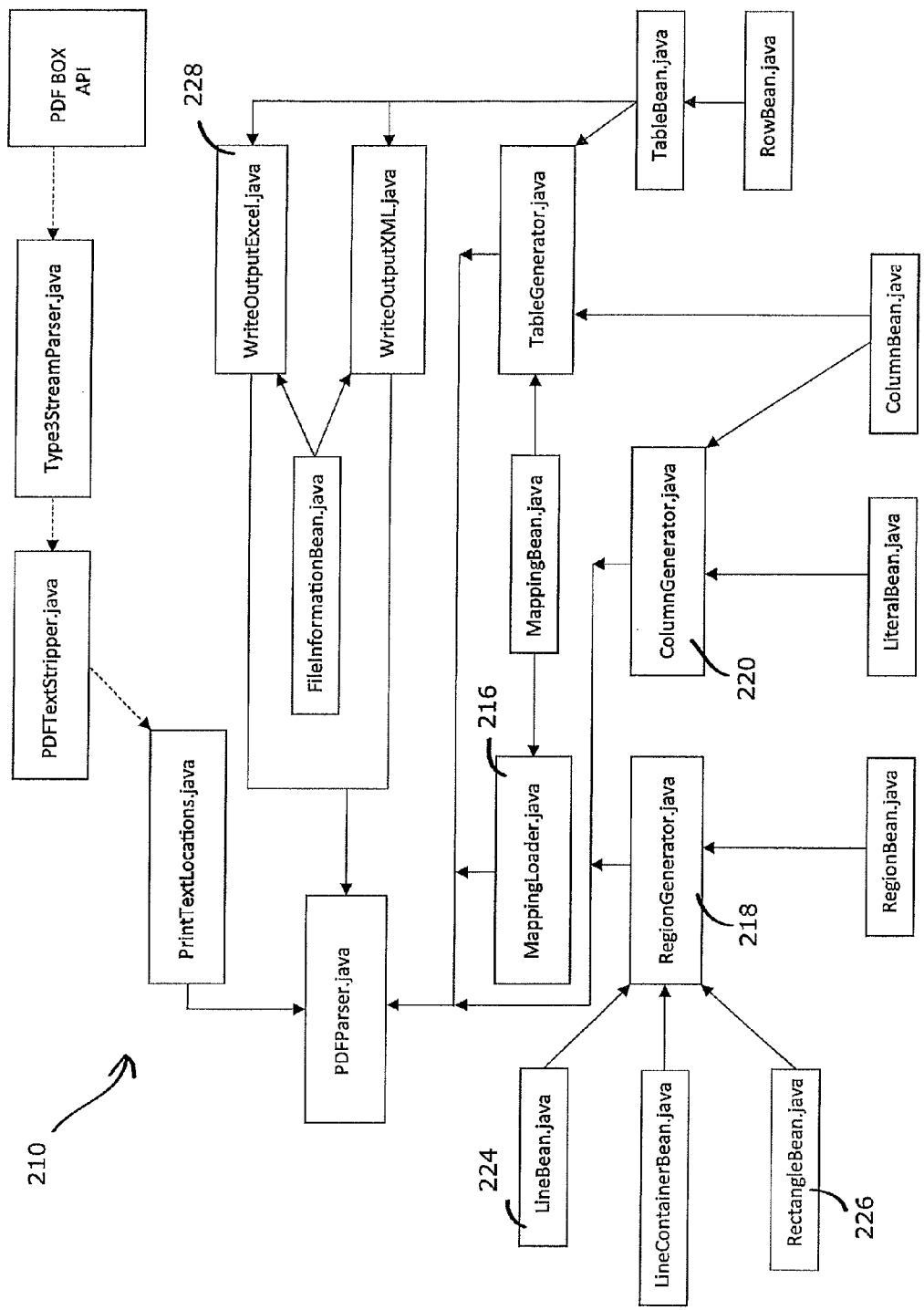
FIG. 21 illustrates the class diagram for a PDF parser incorporated into an exemplary embodiment of the system.

PDF parser class 210, illustrated in FIG. 21, contains the main function where the mapping file data is loaded into an object of a mapping loader 216 needed for the parsing of the PDF file. The process continues, following the sequence of generating the region first using a region generator 218, followed by a column generator 220 and finally a table generator 222.

In region generator 218, the table lines are searched and stored in a line bean class 224. The data from line bean 224 is used to find the sets of connected lines that form a rectangle. As indicated above, the lines are said to be connected if and only if the y-coordinate point of the child line lies between the x-coordinate points of the parent line. The multiple connected lines form a set of rectangles. Using the child-parent relationship described above, a collection of all the parent rectangle per page is set into a rectangle bean 226 and the parent rectangle is further referred to as a region.

The data extracted by PDF parser 210 is written to an EXCEL spreadsheet file by creating a workbook which further creates a sheet which is again divided into rows and columns. The data from the data bean is written on to each row against the attributes mentioned in the database. The EXCEL writer 228 takes the output path to generate a file in EXCEL format from the data extracted from the PDF documents.

Figure 22:
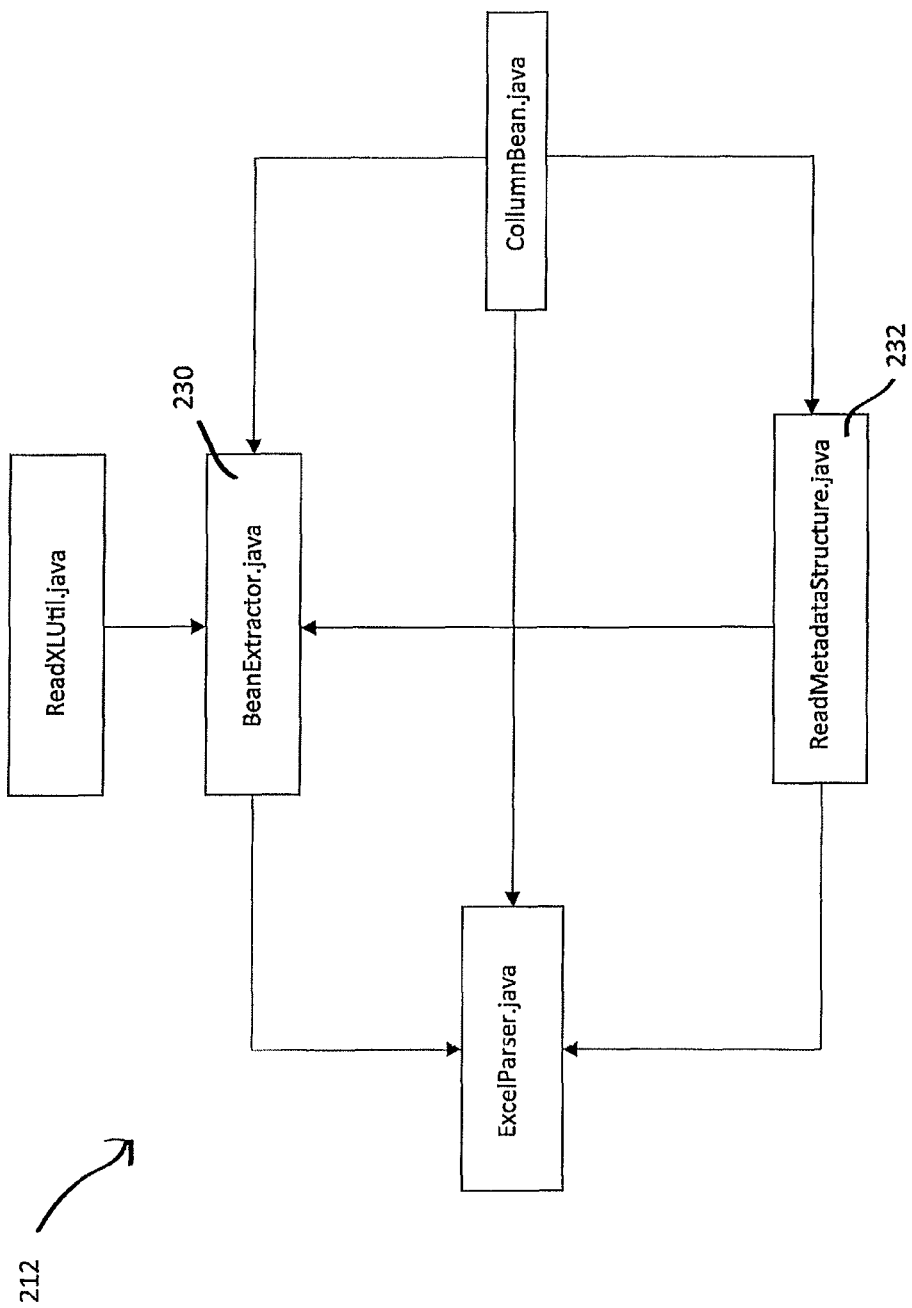
FIG. 22 illustrates the class diagram for a spreadsheet file parser incorporated into an exemplary embodiment of the system.

EXCEL parser class 212 is illustrated in FIG. 22. EXCEL parser 212 calls the parse function, which extracts the mapping file details into a structure for searching the related information from the source file. EXCEL parser 212 then reads the data from the source file and makes a one to one relationship with each of the headers and the value of the headers. These values are then written into an XML and an EXCEL format.

Figure 23:
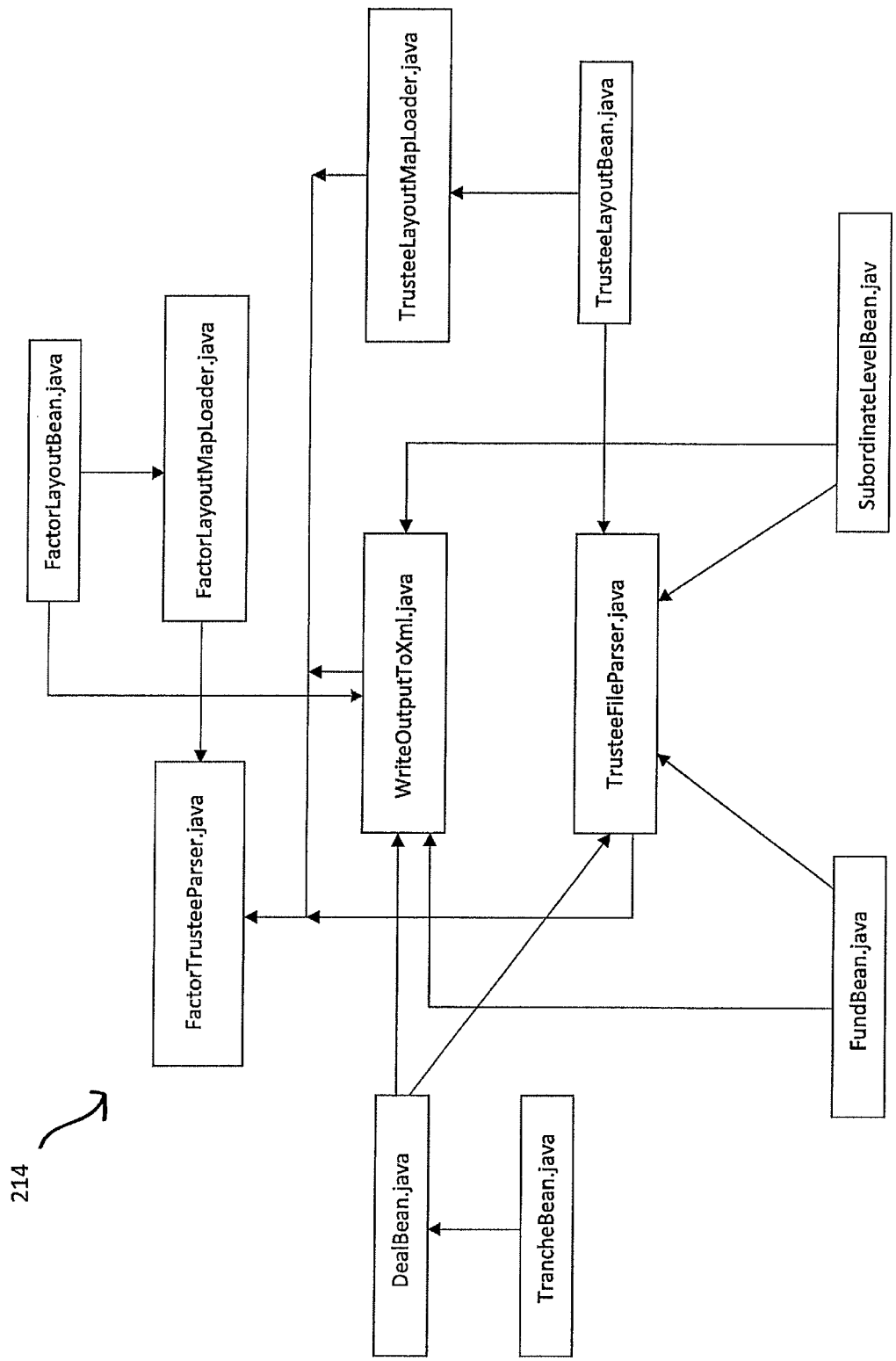
FIG. 23 illustrates the class diagram for a list parser incorporated into an exemplary embodiment of the system.

A bean extractor class 230 in the EXCEL parser 212 contains the function processBeanHorizontally( ) which takes the object of a column bean which contains the mapping string for the search in the source file. The mapping file contains a key value which is compared to the value fetched from the source file. Based on the search of the key value the subsequent attribute values are tracked down. Bean extractor function 230 creates a workbook and the data that is fetched into a bean is written into an EXCEL file. The XML output is created on calling of the function populateXml( ) in bean extractor class 230. The XML file is then generated. A read meta data structure class 232 is the core class which reads the mapping file and the search strings and stores the search strings in a column bean. Based on the value in the mapping structure, the bean attributes are assigned in the function populateBean( ) which takes the cell object. FIG. 23 illustrates the class diagram for the List Parser 214.

The present invention, as described above and shown in the drawings, provides for improved methods and systems for extracting and a manipulating electronic data so that the data can be further manipulated and analyzed. It will be apparent to those skilled in the art that various modifications and variations can be made to the systems and methods of the present invention without departing from the scope of the invention as outlined in the appended claims and their equivalents.

The invention claimed is:

1. A computer-implemented method of converting a plurality of electronic documents into a plurality of digital documents for extracting data, the method comprising:

accessing the plurality of electronic documents from a memory module, wherein the plurality of electronic documents are from a plurality of sources and non-uniform in content, organization and format;

parsing data within the plurality of electronic documents by extracting data from the plurality of electronic documents, the extracted data corresponding to a plurality of keys contained within a mapping structure stored in the memory module;

validating the extracted data to determine whether the parsing is partial or complete, wherein validating comprises comparing the extracted data to a set of rules defined in a validation structure, and wherein partial or complete parsing is determined based on the number of validation rules that are satisfied;

organizing the extracted data into values, wherein each value maps to one of the plurality of keys to form a hash map for each file; and storing the hash map for each file in a database that can be interpreted, manipulated and searched by a computer; and, providing a user access to the database via the computer, wherein the computer allows a user to create a report by mining the database based upon the hash map, the values and the keys stored in the database when one of the keys is provided as a search term by a user wherein extracting data comprises.

2. The method of claim 1 further comprising:

if the parsing is determined as partial, editing the mapping structure;

repeating the parsing step; and repeating the validation step.

3. A computer-implemented method of converting a plurality of electronic documents into a plurality of digital documents for extracting data, the method comprising:

accessing the plurality of electronic documents from a memory module, wherein the plurality of electronic documents are from a plurality of sources and non-uniform in content, organization and format;

determining one or more regions within one or more of the plurality of documents, wherein determining one or more regions comprises: identifying a plurality of connected line elements, using multiple connected line elements to form a plurality of rectangles, analyzing the rectangles to determine one or more parent rectangles, and growing the one or more parent rectangles until one or more parent rectangles are surrounded by white space;

extracting data from at least one of the regions, the extracted data corresponding to a plurality of keys contained within a mapping structure stored in the memory module;

organizing the extracted data into values, wherein each value maps to one of the plurality of keys to form a hash map for each file; and storing the hash map for each file in a database that can be interpreted, manipulated and searched by a computer; and, providing a user access to the database via the computer, wherein the computer allows a user to create a report by mining the database based upon the hash map, the values and the keys stored in the database when one of the keys is provided as a search term by a user wherein extracting data comprises.

4. A computer-implemented method of converting a plurality of electronic documents into a plurality of digital documents for extracting data, the method comprising:

accessing the plurality of electronic documents from a memory module, wherein the plurality of electronic documents are from a plurality of sources and non-uniform in content, organization and format;

extracting data from each electronic document corresponding to a plurality of keys contained within a mapping structure stored in the memory module;

organizing the extracted data into values, wherein each value maps to one of the plurality of keys to form a hash map for each file; and storing the hash map for each file in a database that can be interpreted, manipulated and searched by a computer wherein extracting data comprises:

determining a coordinate system for at least one document, identifying a plurality of line elements within the coordinate system, each line element corresponding to at least one key in the mapping structure, determining whether two or more line elements are connected, using connected line elements to determine one or more regions within the at least one document, identifying a plurality of literals in at least one region, distributing the plurality of literals into one or more columns, retrieving a header from one or more of the columns, comparing the retrieved header to at least one key in the mapping structure, if the retrieved header matches at least one key, collecting the literals in the column having the retrieved header, and wherein the step of distributing literals into columns comprises:

distributing literals into a plurality of rows;

determining minimum and maximum x-coordinates for one of the rows of the plurality of rows;

searching for additional literals having x-coordinates falling between the minimum and maximum x-coordinates; and organizing the additional literals into columns.

* * * * *